United States Patent
Turner et al.

(10) Patent No.: US 8,129,951 B2
(45) Date of Patent: Mar. 6, 2012

(54) POWER CHARGING ASSEMBLY AND METHOD THAT INCLUDES A LOW VOLTAGE ELECTRICAL DEVICE OPERABLE WITH PULSE WIDTH MODULATION (PWM) CONTROL

(75) Inventors: Douglas D. Turner, Shanghai (CN); Mark Wayne Smith, El Paso, TX (US); John V. Caputo, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 12/837,602

(22) Filed: Jul. 16, 2010

(65) Prior Publication Data
US 2012/0013297 A1    Jan. 19, 2012

(51) Int. Cl.
*H01M 10/46* (2006.01)
(52) U.S. Cl. ........................................................ 320/134
(58) Field of Classification Search .................. 320/107, 320/109, 134, 136
See application file for complete search history.

(56) References Cited

U.S. PATENT DOCUMENTS

| | | | | |
|---|---|---|---|---|
| 3,267,348 A | * | 8/1966 | Aldo | 320/165 |
| 5,115,183 A | * | 5/1992 | Kyoukane et al. | 320/123 |
| 5,500,562 A | * | 3/1996 | Kelley | 307/66 |
| 2003/0227277 A1 | * | 12/2003 | Small | 320/112 |

* cited by examiner

*Primary Examiner* — Edward Tso
(74) *Attorney, Agent, or Firm* — Paul W. Thiede

(57) ABSTRACT

A power charging assembly and methods are provided to provide a pre-charge low-current state, a steady-state, high-current charging state, and an unconnect state for an electrical load of an electrical propulsion system in a hybrid electrical vehicle (HEV). The power charging assembly includes a positive contactor device, a negative contactor device, and a non-contactor device means. The rate at which that electrical load is pre-charged may be effectively controlled by using a pulse-width modulated (PWM) signal received by the non-contactor device means. A current-only carrying positive or negative contactor may be configured with the non-contactor device means to further prevent electrical arcing of the contacts of the positive and the negative contactor during power charging assembly operation.

23 Claims, 8 Drawing Sheets

POWER CHARGING ASSEMBLY AND METHOD THAT INCLUDES A LOW VOLTAGE ELECTRICAL DEVICE OPERABLE WITH PULSE WIDTH MODULATION (PWM) CONTROL

TECHNICAL FIELD

This invention relates to a power charging assembly in an electrical propulsion system for a hybrid electric vehicle (HEV) or an electric vehicle (EV), more particularly, the power charging assembly includes a positive contactor device, a negative contactor device, and a non-contactor device means that operatively cooperate to provide a pre-charge low-current state, a steady-state, high-current charging state, and an unconnect state for an electrical load.

BACKGROUND OF INVENTION

It is known, as shown in the prior art configuration of FIG. 1, to electrically charge and discharge an electrical load (1) used in a hybrid electric vehicle (HEV) or electric vehicle (EV) (not shown). The electrical load (1) is pre-charged to a predetermined voltage value before a steady-state high current is applied to the load (1). A first, or positive contactor device (2), a second, or negative contactor device (3), and a third contactor device (4) are operatively controlled with a controller (5) to provide the pre-charge predetermined voltage value to the electrical load (1). Contacting devices (2, 3) are defined as a device being electrically rated for operation at a typical voltage rating of 300-400 volts DC or higher and a typical continuous current rating of several hundred of amps DC or more. Contacting device (4) has a similar voltage rating as contacting devices (2,3), but a typical lower continuous direct current (DC) current rating in the 10 to 20 amp range. Contacting devices (2, 3) generally have a package size that has a typical height of 10 centimeters and a diameter of about 7 centimeters. Contacting device (4) has a typical height of 5 centimeters, a typical length of 4 centimeters, and a typical width 3.5 centimeters. Contactor devices are used because of their known electrical circuit isolation properties. For example, a typical contactor device may have an isolation resistance of greater than 500 ohms/volt. Pre-charging the load to the predetermined voltage value before the steady-state high current is applied to the electrical load is desired so as to limit the in-rush current through the positive and the negative contactor at contact make and to limit the electrical energy applied to the electrical load. A battery (6) is electrically connected with the electrical load (1) through the contactor devices, or relays (2, 3, 4). Relays (2, 3, 4) are make/break relays which may be defined as contact closure that completes the electrical circuit where current flows through the respective relay and break is the opening of the circuit where current does not flow through the relay. It is desired to pre-charge the electrical load through the third contactor device such that closure of the first and second contactor devices into the electrical load to not have a large electrical potential. Closing the first and second contactor device into an electrical load having a large electrical potential may cause undesired damage or reduced service life to the contactor. Similarly, interruption or breaking of the electrical circuit by the contactor under large, or heavy electrical load may also result in the undesired consequence of reduced service life of the contactor.

A current-limiting resistor (7) is connected in series electrical connection with the third contactor relay (4). The current-limiting resistor (7) is used to limit the applied current from the battery (6) through the third contactor relay (4) to attain a certain pre-charge voltage value at the electrical load (1). The electrical load (1) may also be electrically unconnected from the battery with operative control of the contactor relays (2, 3, 4) to prevent current from being applied to electrical load (1).

The third contactor relay (4) that supplies the voltage of the battery (6) to the electrical load (1) has an undesired large size, weight, and cost. The current-limiting resistor (7) has an undesired large size and weight and also radiates undesired heat in relation to the voltage applied thereacross. The physical size of a current-limiting resistor is typically 12 centimeters in length with a height of about 2 centimeters. The resistance value of the current-limiting resister determines the pre-charge voltage value realized at the electrical load (1) with little flexibility to attain different, other pre-charge voltage values.

It is desired to provide a robust, reliable power charging assembly that is configured to provide a pre-charge state, a steady-state, high-current state, and an unconnect state for an electrical load while decreasing the size, weight, parts count, and cost of the corresponding electrical components that make up the power charging assembly. Providing flexibility to attain one of a plurality of values for the pre-charge value of the electrical load is also desired.

SUMMARY OF THE INVENTION

A power charging assembly is used in an electrical propulsion system for a hybrid electric vehicle (HEV) or electric vehicle (EV) to electrically charge and electrically unconnect an electrical load. Electrically charging the electrical load includes providing a pre-charge state to charge the at least one electrical load to a voltage level above an electrical ground potential of the electrical load. Electrically charging the electrical load also includes providing a steady-state, high-current charging state at a point in time after the pre-charge state has been attained. The electrical load may also be electrically unconnected when the power charging assembly is configured to be electrically shut down. The power charging assembly includes a positive contactor device, a negative contactor device, and a non-contactor device means that operatively work together to provide the pre-charge state, the steady-state high-current charging state, and the unconnect state for the electrical load.

A method is provided to enable a pre-charge state and a steady-state, high-current charging state. A further method is also provided to enable an unconnect state for the electrical load.

BRIEF DESCRIPTION OF THE DRAWINGS

This invention will be further described with reference to the accompanying drawings in which.

DETAILED DESCRIPTION

Figure 2:
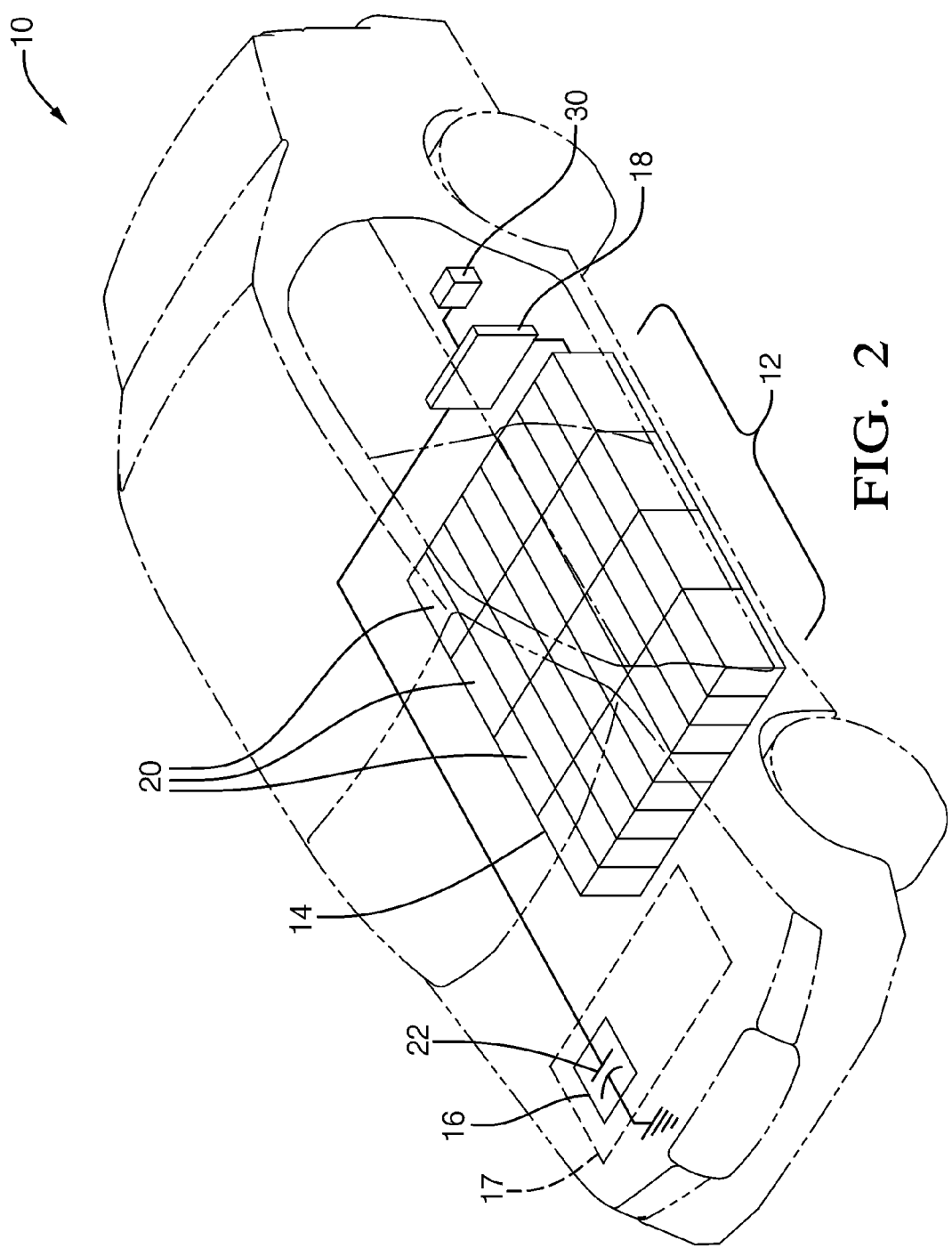
FIG. 2 is a power charging assembly disposed in a hybrid electric car using a solid-state electrical device in accordance with this invention.

A hybrid electric vehicle (HEV) combines a conventional internal combustion engine propulsion system with an electric propulsion system. An electric vehicle (EV) may generally have an electrical propulsion system only. The electric propulsion system assists the HEV or EV to achieve increased fuel economy over a vehicle having only a conventional internal combustion engine. Referring to FIG. 2, a common known HEV is a hybrid electric car 10. The invention is not limited for use in only hybrid electric car 10, but is suitable for any type of vehicle employing HEV technology. For example, hybrid electric trucks, such as pick-ups and tractor-trailer trucks are also growing in consumer popularity.

In accordance with a preferred embodiment of this invention, referring to FIG. 2, car 10 includes an electric propulsion system 12. Electric propulsion system 12 includes a battery 14, a single electrical load 16, and a power charging assembly 18 connected respectively therewith. Assembly 18 is disposed between battery 14 and load 16. Battery 14 is shown disposed along a floor of car 10. Alternately, the battery may be packaged anywhere in the car that meets electrical requirements for an HEV or EV application. Assembly 18 is used to gate and bridge the voltage/current loads from battery 14 to electrical load 16. Assembly 18 includes having a pre-charge low-current state, a steady-state, high-current charging state, and an unconnect state for an electrical load. The pre-charge state is defined as when electrical load 16 is electrically charged with voltage from battery 14 in a controlled manner. During the pre-charge state the battery and the electrical load are coupled in a more limited manner than in the steady-state, high-current state. The steady-state, high-current state is defined as when the electrical 16 is continuously charged with electrical energy at a point in time after the pre-charge state during power charging assembly operation. During the steady-state, high-current state, battery 14 and electrical load 16 are directly coupled. The unconnect state defines electrical load 16 being uncoupled, or disconnected from battery 14.

It is desirable to keep load 16 from being void of voltage. Assembly 18 is employed to assist load 16 to be pre-charged with voltage and provide a steady-state, high-current state for load 16. Energy stored in load 16 assists to improve electromagnetic performance of assembly 10. Preferably, assembly 18 is located proximate to battery 14 which is useful to prevent high electrical current being active on electrical lines, wires, or cables (not shown) disposed in HEV car 10 when the electrical propulsion system is electrically shut-down. Electrical load 16 is disposed remote from assembly 10 and battery 14. Alternately, the electrical load may be disposed proximate the power charging assembly. As shown in FIG. 2, load 16 is disposed in engine compartment 17 of hybrid electric car 10. A plurality of battery cells 20 are electrically coupled together and suitable to ensure electrical load 16 has a continuous supply of electrical current during operation of electric propulsion system 12. Alternately, the battery may be a single battery cell (not shown). Preferably, electrical load 16 is a capacitive electrical load 22 coupled with a downstream DC/DC converter assembly (not shown). Capacitive electrical load 22 is useful to filter and store electrical energy locally adjacent the downstream electrical load to reduce undesired electromagnetic magnetic interference (EMI). Local energy storage for the downstream electrical load assists to prevent high voltage electrical energy from being drawn through the HEV from a battery that is remotely disposed away from the downstream electrical load. For example, a downstream electrical load may be a DC/DC converter (not shown). The DC/DC converters convert high voltage levels supplied from the battery to lower voltage loads to power headlights, horns, radios, and the like, in the HEV. Alternately, the downstream electrical load may be an inverter/motor drive assembly.

It is undesirable for a steady-state, high-current state of assembly 10 to be supplied to electrical load 16 when electrical load 16 is at an electrical ground reference voltage potential. Some HEV applications may have an electrical ground reference voltage potential of zero volts$_{DC}$. Electrical load 16 is electrically pre-charged to a suitable electrical potential to allow efficient operation of the downstream electrical loads. Alternately, electrical load 16 may be a resistive or an inductive electrical load. Still yet alternately, electrical load 16 may include a plurality of electrical loads that are respectively coupled or combined with downstream electrical loads dependent on the requirements of a specific HEV application.

For example, should the steady-state, high-current state occur when the electrical load is at an electrical ground potential, premature arcing of the contactors may result causing concomitant damage to the contactors and the assembly. More preferably, it is desirable to pre-charge the electrical load to a predetermined voltage value greater than electrical ground potential but less than the voltage level of the battery before application of the steady-state high-current state to the electrical load. After electrical load 16 has been pre-charged to a predetermined voltage level, assembly 10 is adapted to supply a continuous supply of high-current charging to ensure the voltage and current requirements of electrical load 16 is maintained during steady-state operation of electrical propulsion system 12.

Assembly 10 is also further adapted to have an unconnect state to unconnect electrical load 16 before assembly 10 is electrically shut-down to ensure current is not being further supplied to charge electrical load 16. The unconnect state is useful for when a service technician is required to service assembly 18 or a portion of electrical propulsion system 12 such that possible undesired electrocution or other injury to the service technician is prevented. Typically, the downstream electrical loads electrically coupled with respective electrical loads in an electrically charged circuit will discharge stored energy into the electrical loads. The unconnect state is also useful if the HEV car is in an undesired accident. If an accident occurs, the controller is configured to perform an electrical shut-down of the electrical propulsion system that includes the power charging assembly. Alternately, a plurality of electrical loads may be pre-charged simultaneously. Further alternately, a plurality of electrical loads may be put in the steady-state, high-current state simultaneously with the battery. Still yet alternately, a plurality of electrical loads may be electrically unconnected from the battery simultaneously.

Figure 3:
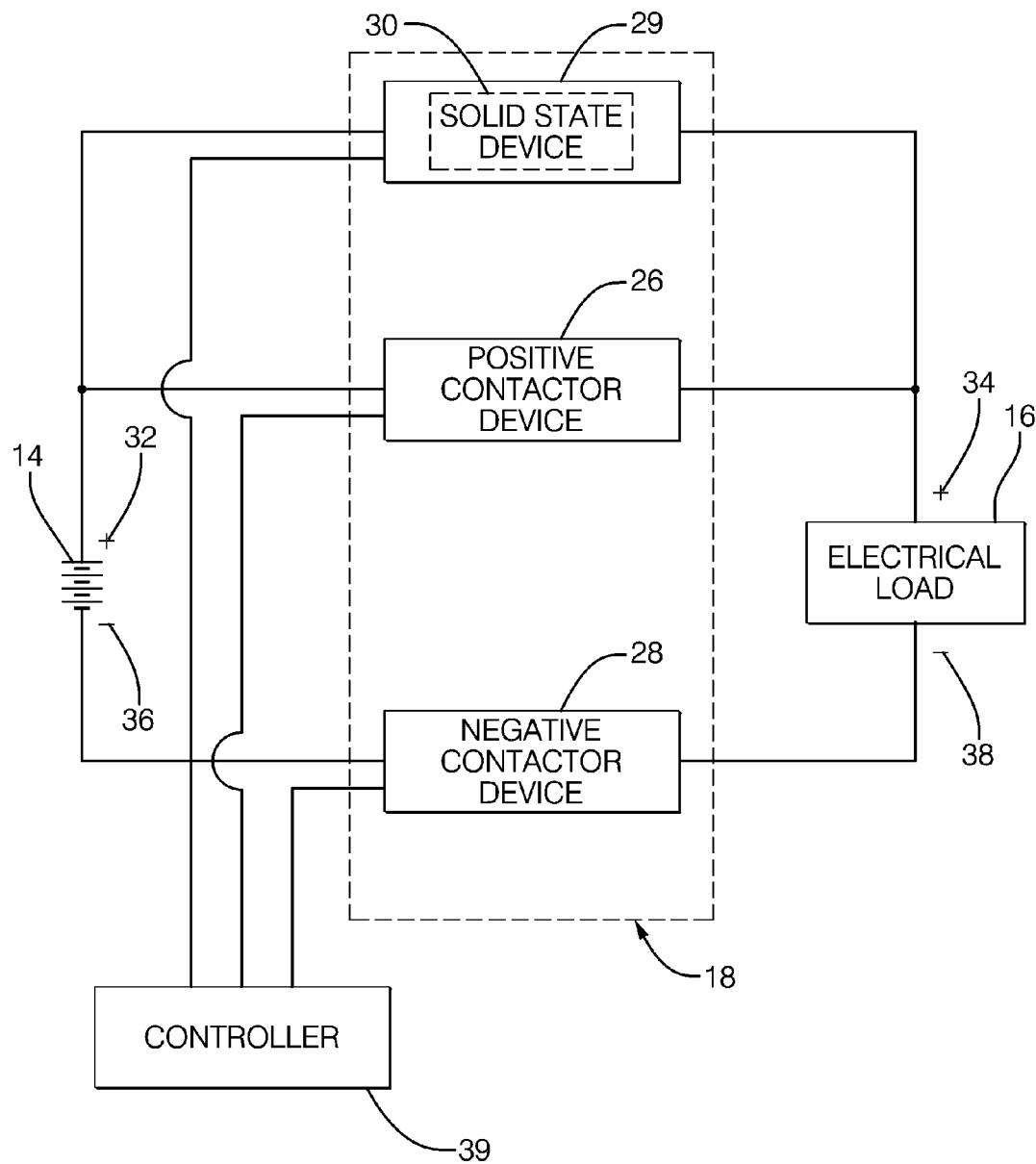
FIG. 3 is an electrical schematic diagram of the power charging assembly of FIG. 2.

Referring to FIG. 3, power charging assembly 18 includes a positive contactor device, or relay 26, a negative contactor device, or relay 28, and a non-contactor device, or relay means 29. A non-contactor device means is defined as a device that makes or breaks the circuit with less than several hundred volts DC. Contactor relays 26, 28 have an ON position and an OFF position. When in the ON position contactors 26, 28 electrically connect battery 14 with electrical load 16. When in the OFF position, contactors 26, 28 electrically disconnect battery 14 with electrical load 16. The make/break contactors 26, 28 may have a physical size similar to that of a small raisin box or a dimensional area of about 2 inches by 3 inches. Non-contactor relay means 29 is a solid-state electrical device 30. Solid-state device 30 may be an IGBT electrical device, MOSFET electrical device, or bipolar power electrical device, and the like. Positive contactor relay 26 is in electrical connection with a positive side 32 of battery 14 and positive side of electrical load 34. Negative contactor relay 28 is in electrical connection with a return side 36 of battery 14 and a return side 38 of electrical load 16. Contactor relay 26 is in parallel electrical connection with contactor relay 28. Solid-state device 30 is in electrical connection with positive side of battery 32 and positive side of electrical load 34. Solid-state device 30 is in parallel electrical connection with contactor relays 26, 28. Contactor relays 26, 28 and solid-state device 30 are in electrical connection with a controller 39. Controller 39 is configured to operatively control devices 26, 28, 30 to provide a pre-charge voltage to load 16 and also the steady-state, high-current state for load 16. Preferably, controller 39 may be a computer or processor, and the like, that is preferably located near the battery in the car and is part of the electric propulsion system 12. Controller 39 is disposed in electrical propulsion system 12, but not in power charging assembly 18. Alternately, the controller may be packaged as part of the power charging assembly. Contactor relays 26, 28 are also useful to protect occupants of the HEV car or service technicians servicing the HEV car from high voltage when the electrical propulsion system is not in use. When contactor relays 26, 28 are electrically connected the electrical circuit electrically connected with contactor relays 26, 28 may see a 300-400 volt jump in applied voltage.

When power charging assembly 18 is not in operation or turned electrically OFF, no voltage or current is delivered from battery 12 to load 16. Positive and negative contactor devices 26, 28 do not provide connection with battery 12 and load 16 and no voltage or current is transferred to electrical load 16 from battery 14.

Figure 4:
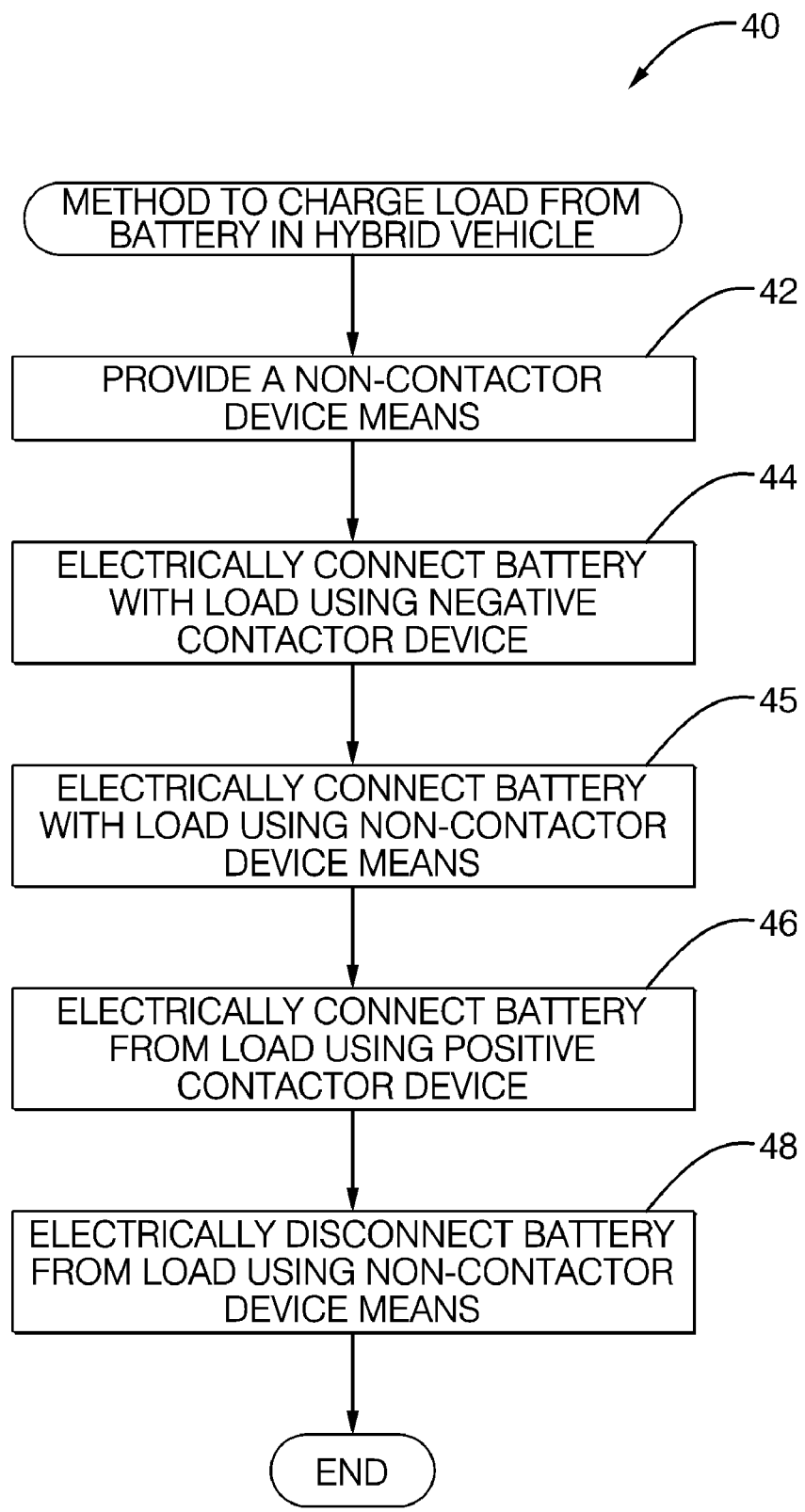
FIG. 4 is a method to attain a pre-charge state and a steady-state, high-current state for an electrical load using the power charging assembly of FIG. 3.

Referring to FIG. 4, power charging assembly 18 operates to charge load 16 when assembly 18 is electrically turned ON and used in steady-state operation. A method 40 to charge load 16 includes a step 42 of providing a non-contactor device means. Another step 44 includes electrically connecting battery 14 with at least one electrical load 16 using negative contactor device 28. A further step 45 of method 40 includes electrically connecting battery 14 with at least one electrical load 16 using non-contactor device means 29 which puts assembly 18 in a pre-charging state. The pre-charging state of assembly 18 occurs to at least partially electrically charge at least one electrical load 16 from an initial reference ground voltage potential of load 16.

After the pre-charge state is enabled a further step in method 40 is electrically connecting battery 14 with at least one load 16 using positive contactor device 16. With electrical connection of positive contactor 16, a steady-state high-current state occurs in assembly 18 to charge at least one electrical load 16. Once the steady-state, high-current state is employed, another step 48 in method 40 includes electrically disconnecting battery 14 from at least one load 16 using solid-state device 30. The electrical path to load 16 through solid-state device 30 has a current flow value that is generally less than the current flow value to the load for the steady-state, high-current state. Thus, the current flow path through solid-state device is not needed once the steady-state, high-current state in assembly 18 is realized. Preferably, at least one solid-state electrical device 30 disconnects from the at least one electrical load after the at least one electrical load is substantially electrically discharged. This may occur in a period of time after the load is effectively pre-charged. Preferably, sensing of the voltage on load 16 and the voltage of battery 14 may be compared to determine any voltage potential that may exist that indicates the pre-charging state is not yet complete. Typically, the pre-charge state is a timed event. This means that the artesian would know the amount of capacitance on the load side of the circuit and the battery voltage as well as the series resistance of the pre-charge resistor. In this manner, the time constant for achieving the pre-charge state may be determined and designed into the circuit of assembly 18.

Figure 5:
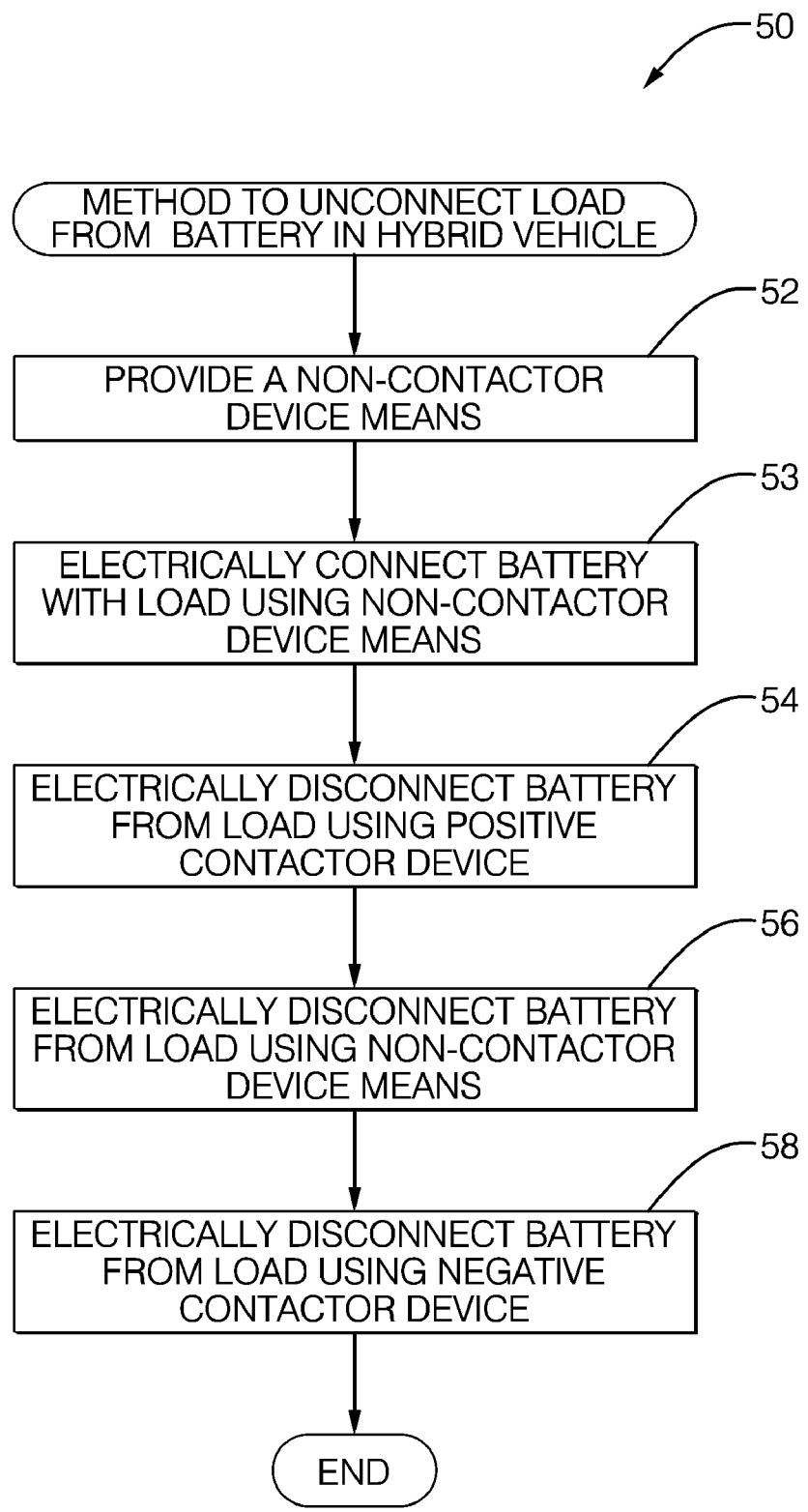
FIG. 5 is a method to unconnect the electrical load using the power charging assembly of FIG. 3.

Referring to FIG. 5, when assembly 18 is desired to be electrically shut down a method 50 for electrically unconnecting load 16 from battery 14 is provided. A step 53 in method 50 is electrically connecting battery 14 with at least one electrical load 16 using non-contactor device means 29. A further step in method 50 is electrically disconnecting battery 14 from at least one electrical load 16 using positive contactor device 26. In another step in method 50 is electrically disconnecting battery 14 from at least one electrical load 16 using non-contactor device means 29. In yet a further step in method 50 is electrically disconnecting battery 14 form at least one electrical load 16 using negative contactor device 28.

Figure 6:
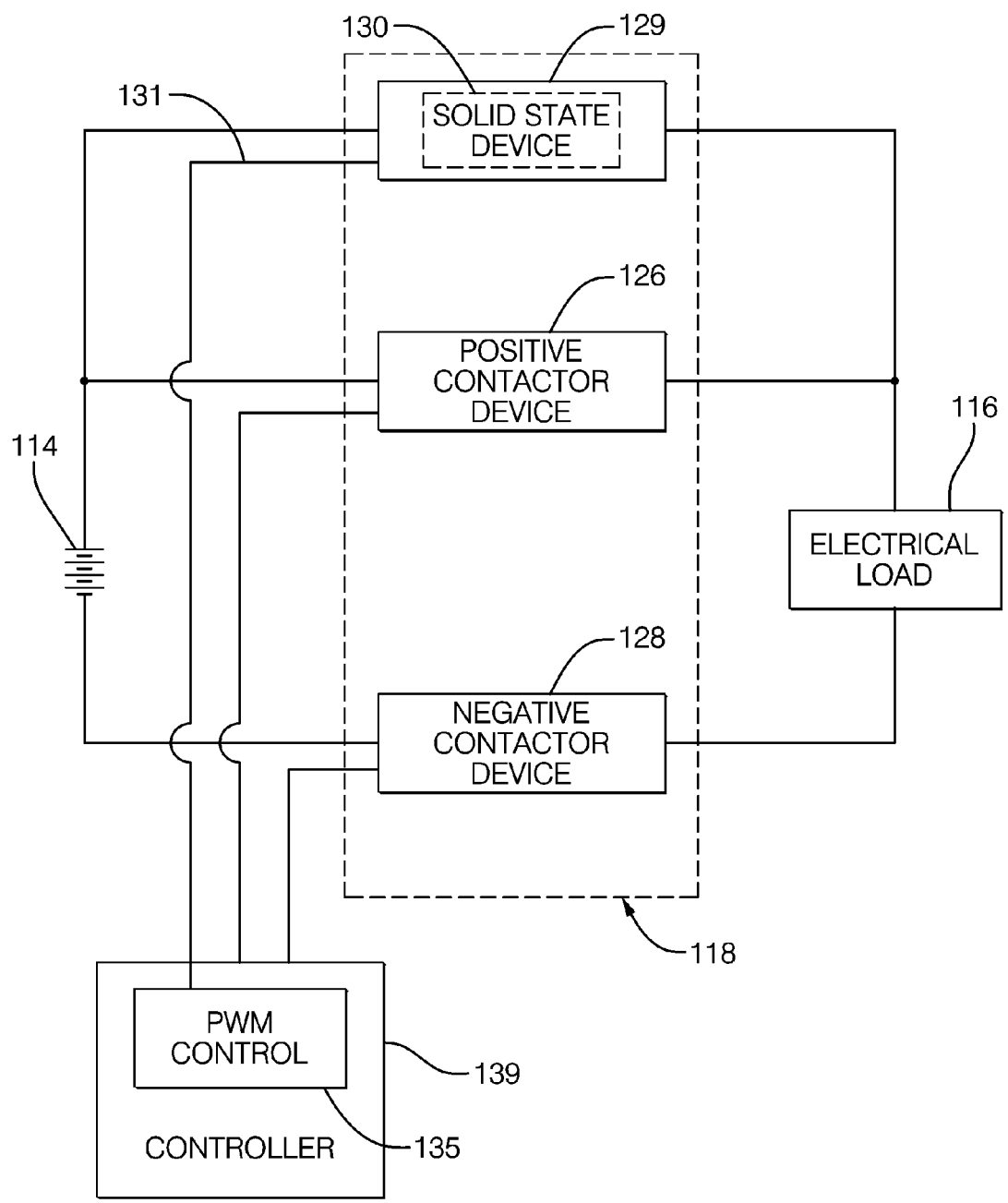
FIG. 6 is a power charging assembly where the solid-state device is operatively controlled using a pulse-width modulated (PWM) electrical signal in accordance with an alternate embodiment of this invention.

Referring to FIG. 6, in an alternate embodiment of the invention, a charging assembly 118 with a solid-state device 130 being controlled with a pulse-width modulated electrical signal 131 is presented. Similar elements in the alternate embodiment of FIG. 6 with the embodiment of FIGS. 2-5 have reference numerals that differ by 100. Solid-state device 130 receives a PWM signal 131 from a controller 139. Controller 139 includes a PWM control algorithm 135 in a memory (not shown) of controller 139 that sets the rate and the magnitude that solid-state device 130 is controlled, and hence load 116 is pre-charged. Preferably, a low current level PWM signal is applied to a gate or base of the solid-state device. Also preferably, when the PWM signal is initially applied to the solid-state device, a narrow PWM pulse is utilized to minimize possible in-rush currents from being applied from the battery through the solid-state device. After a time period, the duty-cycle of PWM signal 131 would widen to allow for controlled pre-charge of load 116. For example, the value of the voltage of load 116 may have different values during real-time operation of assembly 118. This may allow for additional design flexibility with the pre-charge state functionality, the PWM control, and the circuit elements employed to produce the pre-charge state. PWM signal 131 may have a duty cycle from zero percent (0%) to one-hundred (100%) percent which is useful to pre-charge load 116 as applied by controller 139. In this manner the pre-charge state for load 116 may be accurately controlled to achieve a specific voltage value over a determined time period. As full charge is reached on load 116, the duty-cycle of PWM signal 131 would decrease so an orderly transition to the steady-state, high-current mode may occur. With the configuration in FIG. 6, a current-limiting resistor in series electrical connection with the solid-state device may not be needed. Yet alternately, a current-limiting resistor may be included in series electrical connection with the solid-state device to further limit the current to the electrical load from the solid-state device. The current-limiting resistor employed is a special kind of resistor, that when heated, the resistance characteristics are altered such that large electrical current surges from the battery are prevented from impacting downstream electrical loads. The current limiting resistor is also configured to allow different amounts of electrical power to proceed through it. Using the PWM control as shown in FIG. 6 may allow for a current limiting resistor of decreased physical size or may be eliminated altogether due to the heat dissipated through the resistor being decreased or eliminated. When the pre-charge state commences, the voltage potential between the battery and the load capacitors is essentially battery voltage (300-400V). As the circuit of assembly 118 begins charging the voltage potential between load 116 and battery 114 decreases. Since the resistor is a fixed resistance value, the current will change as a function of the voltage potential between the battery and the load and the resistor value according to Ohm's law. Using PWM control of the solid-state device allows the electrical loading of the electric load to be customized to a particular HEV car application. If the circuit of FIG. 6 is used without a series pre-charge resistor, preferably the number of pulses along with the resistance of solid-state device 129 may be used to determine the time for pre-charge state to be completed. The voltage comparison between the voltage at battery 114 and the voltage at electrical load 116 may be used as a confirmation of pre-charge state.

Figure 1:
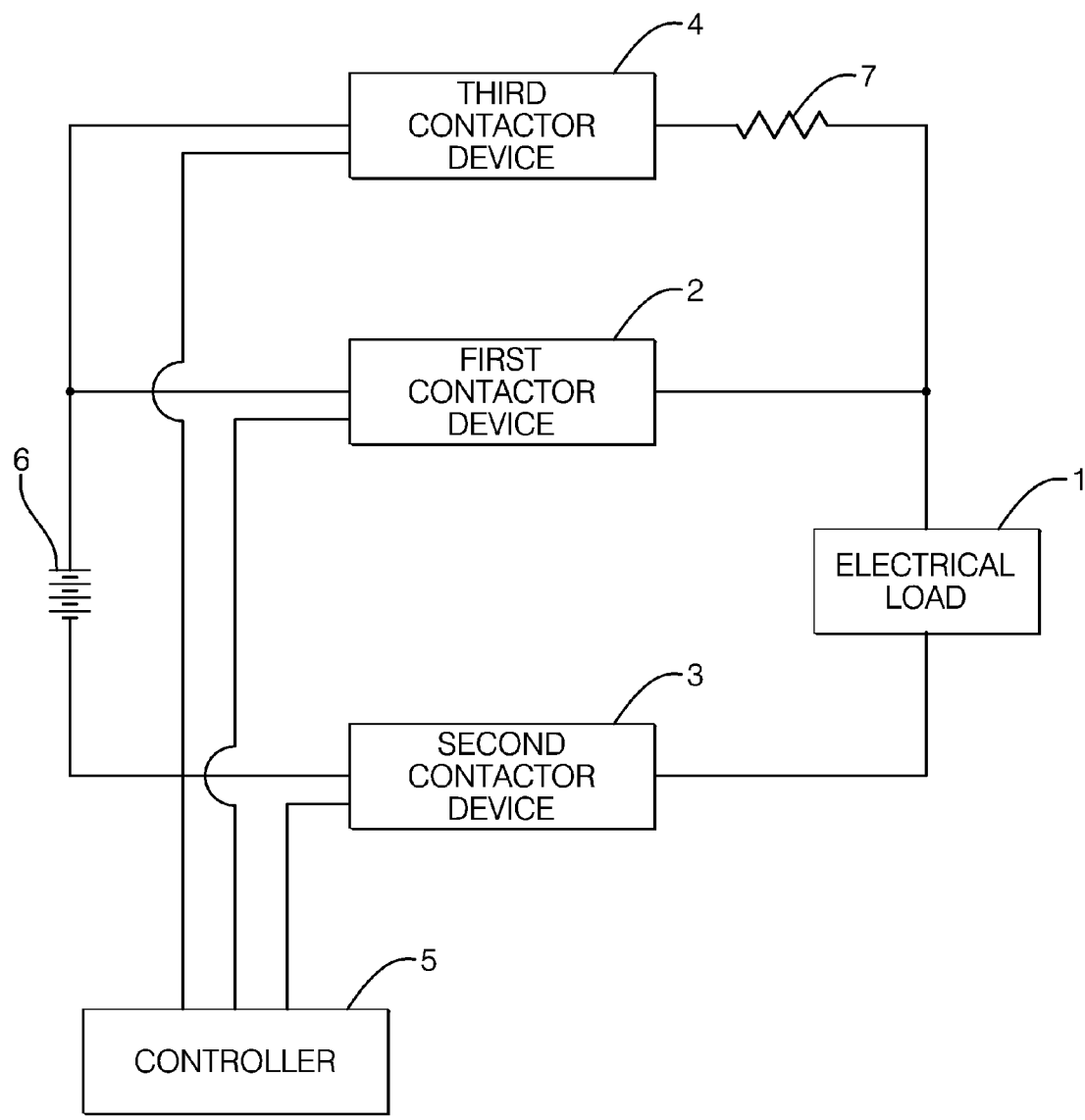
FIG. 1 is an electrical schematic diagram of a prior art charging electrical circuit used in a hybrid electric vehicle.
Figure 7:
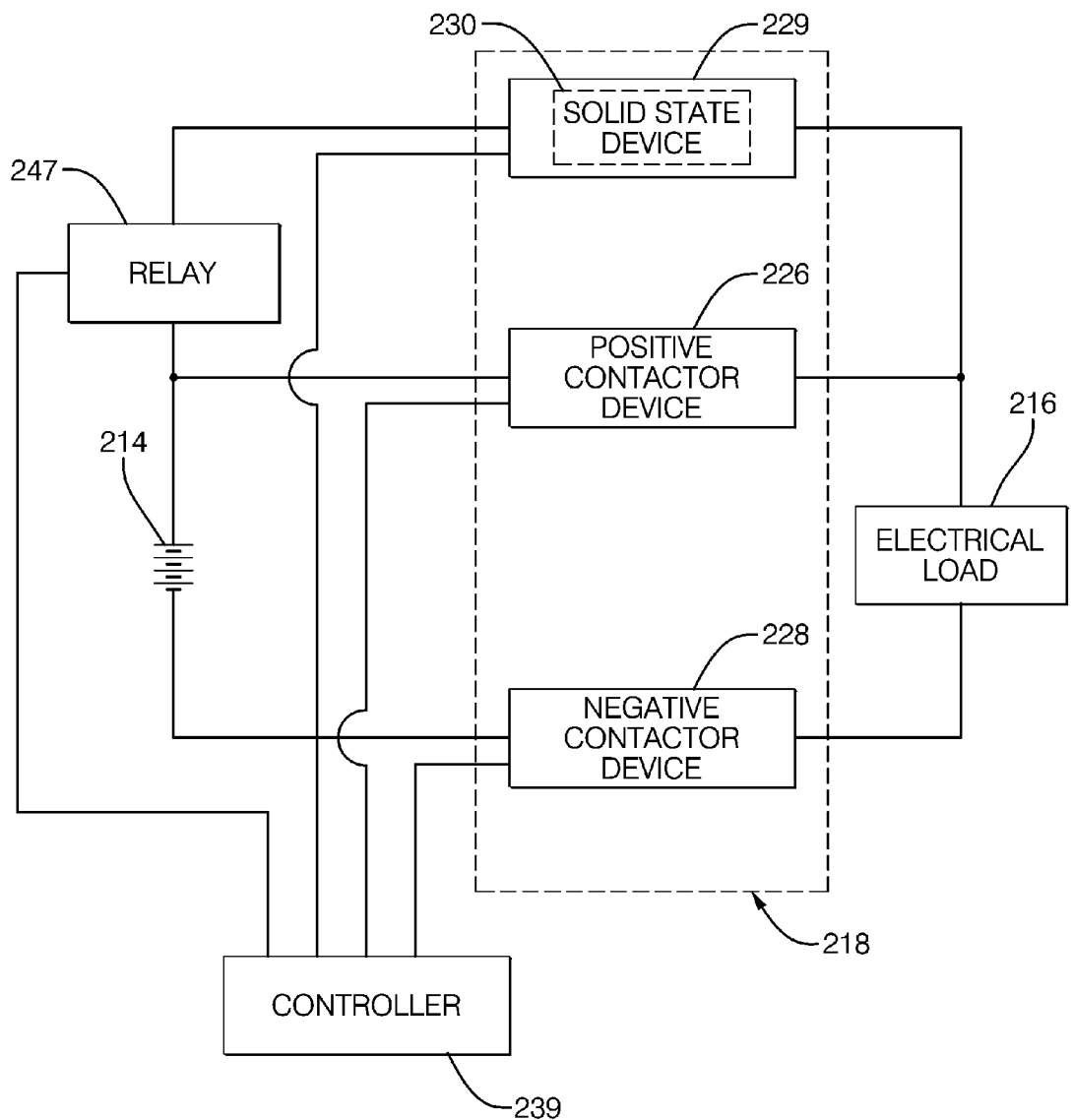
FIG. 7 is an electrical schematic diagram of the power charging assembly using a low-voltage relay in series electrical connection with the solid-state electrical device in accordance with a further alternate embodiment of this invention.

Referring to FIG. 7, in a further alternate embodiment of the invention, a low-voltage relay 247 may be disposed in series electrical connection with a solid-state device 230. Low-voltage relay 247 is defined is a relay with a contact voltage rating less than 40 volts and a continuous DC current rating in the 10 to 20 amp range. A typical low-voltage relay has a typical physical size that is one-fourth the physical size of third contactor 4 in the embodiment of prior art FIG. 1. Similar elements in the alternate embodiment of FIG. 7 with the embodiment of FIGS. 2-5 have reference numerals that differ by 200. Relay 247 may be useful to provide additional electrical isolation between a battery 214 and a load 216 than just using solid-state device 230 separately. In the electrical operation of the circuit of an assembly 218, relay 247 closes first under no-load conditions where solid-state device 230 is turned OFF. Next, a negative contactor 228 is closed and electrically connects battery 214 with load 216. Next, solid-state device 230 is activated so that the pre-charge state is performed on load 216. Next, a positive contactor 226 is closed across the pre-charge circuit of relay 247 and solid-state device 230. Next, solid-state device 230 is deactivated, or electrically turned OFF. Next, relay 247 is opened to isolate solid-state device 230. Alternately, embodiment of FIG. 7 may employ PWM control as discussed in the embodiment of FIG. 6.

Figure 8:
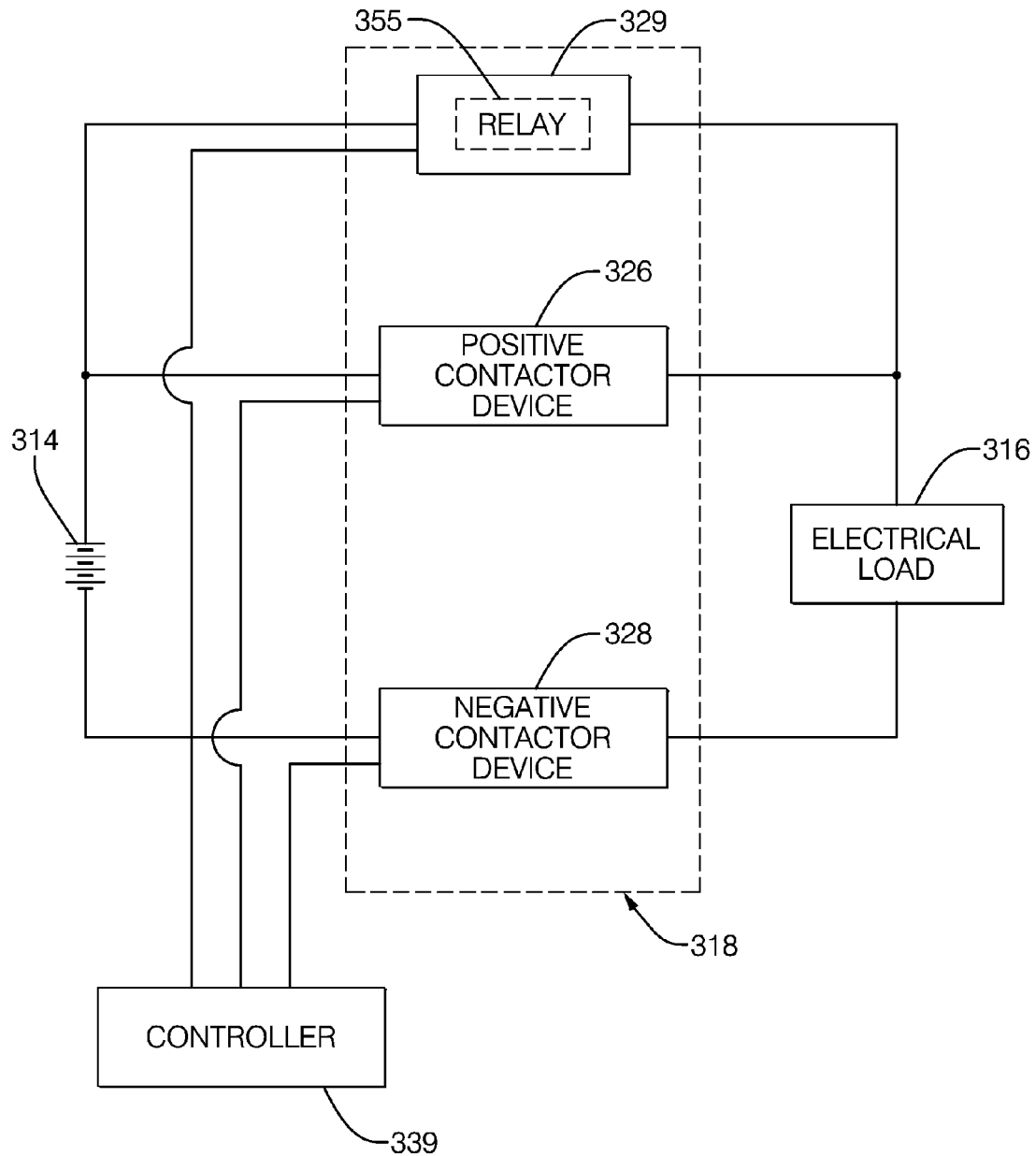
FIG. 8 is an electrical schematic diagram of the power charging assembly including a low-voltage relay that provides the pre-charge voltage value to the electrical load in accordance with yet another alternate embodiment of this invention.

Referring to FIG. 8, in yet another alternate embodiment of the invention, a low-voltage, low-current relay 355 may be employed as the non-contactor device means to perform the pre-charge state functionality. Relay 355 has similar electrical and physical characteristics and functionality as relay 247 in the embodiment of FIG. 7. Similar elements in the alternate embodiment of FIG. 8 with the embodiment of FIGS. 2-5 have reference numerals differing by 300. Relay 355 also has a decreased cost as compared with third contactor 4 in the prior art embodiment of FIG. 1. A first step is relay 355 closing to connect a battery 314 with a load 316. Next, a negative contactor 328 is closed connecting battery 314 with load 316. Next, the pre-charge state is preformed on load 316. Next, a positive contactor 326 is closed across relay 355.

Next, relay 355 is opened that unconnects load 316 from battery 314. Preferably, a pre-charge resistor (not shown) may be used in electrical series connection with relay 355 to further limit the current applied to load 316.

In one alternate embodiment, at least one of the positive and the negative contactor may be configured as a current-only carrying relay. This arrangement is useful to increase useful life for the positive and the negative contactor devices. If the positive contactor is the current carrying only-contactor, the positive contactor works in operative combination with the negative contactor and non-contactor device means to prevent electrical arcing of the contact (not shown) of positive contactor relay when the contact is urged from the open-to-closed position or from the closed-to-open position when the circuit loop is closed with the electrical load. The non-contactor device means has no contact and cannot arc. To mitigate arcing, positive current-only contactor is maked, or closed first. If there is no current flowing through the positive contactor, this indicates the negative contactor and the non-contactor device means are not ON or closed, and thus no arc occurs at the contacts of positive contactor. Subsequently, non-contactor device means is turned on allowing the pre-charge state to take place with the circuit powered through the positive and negative contactor devices. With negative contactor device already closed and non-contactor device being a solid-state electrical device, no electrical arc occurs during circuit operation of the power charging assembly. Once the pre-charge state is complete and the voltage of electrical load 16 is approximately the value of battery, the positive contactor device is then closed. Since there is little or no voltage potential between battery and electrical load, no arc potential exists and the contacts (not shown) of device will experience no arc event. Negative contactor would be used to break the circuit under high voltage conditions and the positive current-only contactor would not be required to interrupt the high voltage condition.

In a further alternate embodiment of the invention, a single solid-state device may be a plurality of solid-state devices used in series or parallel electrical connection with the electrical load to provide the pre-charge state to the electrical load. By combining the solid-state devices in series electrical connection, a high voltage isolation may be realized during the open or OFF condition of the solid-state devices. In parallel electrical connection, the solid-state devices may share electrical current allowing a combination of lower current rated solid-state devices to be used to perform the pre-charge state. The solid-state devices may also share the thermal load more effectively than a single packaged solid-state device. Alternately, the PWM control of the embodiment of FIG. 6 may be employed in the embodiment of FIG. 7.

In a further alternate embodiment of the invention, a single solid-state device may be a plurality of solid-state devices used in series or parallel electrical connection with the electrical load to provide the pre-charge state to the electrical load. By combining the solid-state devices in series electrical connection, a high voltage isolation may be realized during the open or OFF condition of the solid-state devices. In parallel electrical connection, the solid-state devices may share electrical current allowing a combination of lower current rated solid-state devices to be used to perform the pre-charge state. The solid-state devices may also share the thermal load more effectively than a single packaged solid-state device. Alternately, the PWM control of the embodiment of FIG. 6 may be employed in the embodiment of FIG. 8.

Still yet alternately, one or more current sensors may be employed at the battery to measure the charging current or discharging current. The current sensors may be packaged on the same printed circuit board as the positive and the negative contactor device and the non-contactor device means. For example, if there is a safety issue involving overcurrent, the controller may issue an orderly electrical shutdown of the power charging assembly and the electrical propulsion system.

Still yet alternately, a processor that monitors a current sensor to monitor the charging or discharging current from the battery may perform a coulomb counting operation and transmit this information to the power charging assembly over a serial communication data bus such as CAN or LIN serial communication data bus.

Alternately, the charge of the electrical load may be monitored by the controller to know the charging status of the electrical load.

Alternately, if the positive or negative contactor is an electrical current-carrying contactor with no applied voltage, undesired electrical arcing of a contactor when the contact is closed in the circuit is further minimized. Typically, the current-carrying contactors are not suitable for high voltage switching applications, but rather are configured to carry high current loads. Thus, current-carrying contactor would be configured to be protected from interruption or connection of a high voltage from the battery or within the electric propulsion system.

Another alternately embodiment may be to transfer the PWM signal information as digital signal over a communication data bus for PWM control of the solid-state device.

Still yet alternately, while the pre-charge state occurs through the positive side of the leg of the electrical load in the embodiments of FIGS. 3-8, the pre-charge state may occur being configured in the power charging assembly through the negative side of the leg of the electrical load.

Thus, a robust assembly and method have been presented to robustly and reliably provide a pre-charge state, a steady-state, high-current state, and an unconnect state using a positive contactor, a negative contactor, and a non-contactor device means. The non-contactor device means may be at least one solid-state electrical device such as a FET or IGBT device. Using a solid-state device may have a longer operational service life that an electro-mechanical high voltage, high current contactor. The solid-state device has a decreased physical size and at a decreased cost than a contactor device yet provides robust electrical operation. The solid-state electrical device may receive a PWM signal from a controller to operatively control the pre-charge voltage value delivered to the electrical load. A range of pre-charge voltage values realized from control of the received PWM signal provides for customized pre-charging of the electrical load. The positive and the negative contactor and the solid-state electrical device may be packaged on a single printed circuit board (PCB) having a decreased size for more effective packaging and decreased mass of the power charging assembly. Effective PWM control may allow a current limiting resistor in series electrical connection with the solid-sate electrical device to be eliminated further simplifying the PCB layout of the power charging assembly. A low voltage relay disposed in series electrical connection with the solid-state device may provide further electrical isolation over isolation provided using only solid-state devices. The non-contacting device means may also be a low voltage relay used in parallel electrical connection with a positive and a negative contactor device to provide an alternate approach to provide an effective pre-charge state for charging an electrical load. Implementing a current-only carrying positive or negative contactor may be useful in mitigating undesired arcing of the contacts of the contactors during power charging assembly operation.

While the present invention has been shown and described with reference to certain preferred embodiments thereof, it will be understood by those skilled in the art that various changes in form and details may be made therein without departing from the spirit and scope of the present invention as defined by the appended claims.

All terms used in the claims are intended to be given their broadest ordinary meanings and their reasonable constructions as understood by those skilled in the art unless an explicit indication to the contrary is made herein. In particular, use of the singular articles such as "a," "the," "said," . . . et cetera, should be read to recite one or more of the indicated elements unless a claim recites an explicit limitation to the contrary.

We claim:

1. A power charging assembly used in an electrical propulsion system for a hybrid electric vehicle to electrically charge at least one electrical load, comprising:
   a negative contactor device outputting a return electrical signal to a battery and receiving a return electrical signal from the at least one electrical load;
   a positive contactor device receiving an electrical signal from the battery and outputting an electrical signal to the electrical load; and
   a low-voltage electrical device means adapted for receiving an electrical signal from the battery and outputting an electrical signal to the electrical load.

2. The power charging assembly according to claim 1, wherein the low-voltage electrical device means is at least one solid-state electrical device.

3. A power charging assembly used in an electrical propulsion system for a hybrid electric vehicle to electrically charge at least one electrical load, comprising:
   a negative contactor device outputting a return electrical signal to a battery and receiving a return electrical signal from the at least one electrical load;
   a positive contactor device receiving an electrical signal from the battery and outputting an electrical signal to the electrical load; and
   a non-contactor device means adapted for receiving an electrical signal from the battery and outputting an electrical signal to the electrical load,
   wherein the non-contactor device means is at least one solid-state electrical device, and
   wherein the at least one solid-state electrical device receives a variable pulse-width modulated (PWM) electrical signal, and the at least one electrical load electrically charges in proportion to the received PWM electrical signal.

4. The power system according to claim 2, wherein the at least one solid-state electrical device is one of,
   (i) a FET-type device, and
   (ii) an IGBT-type device.

5. The power charging assembly according to claim 2, wherein the at least one solid-state electrical device comprises a single device.

6. The power charging assembly according to claim 1, wherein the positive contactor device, the negative contactor device, and the low-voltage electrical device means is configured in parallel electrical connection between the battery and the at least one electrical load.

7. The power charging assembly according to claim 1, wherein the low-voltage electrical device means stops charging the at least one electrical load before the at least one electrical load is substantially electrically charged.

8. The power charging assembly according to claim 1, wherein the battery and a relay and the low-voltage electrical device means have a series electrical connection one-to-another.

9. The power charging assembly according to claim 1, wherein at least one of,
(i) the positive contactor device, and
(ii) the negative contactor device,
is a device adapted for carrying only electrical current.

10. The power charging assembly according to claim 1, wherein the power charging assembly is further configured to operatively electrically unconnect with the at least one electrical load by operative control of the positive contactor device, the negative contactor device, and the low-voltage electrical device means.

11. A method for electrically connecting to electrically charge at least one electrical load from a battery using a power charging assembly disposed in a power system of a hybrid electric vehicle, said power charging assembly including a positive contactor device and a negative contactor device, said method comprising:
providing a low-voltage electrical device means;
electrically connecting the battery with the at least one electrical load using the negative contactor device;
electrically connecting the battery with the at least one electrical load using the low-voltage electrical device means, whereby a pre-charging state occurs to charge the at least one electrical load.

12. The method according to claim 11, further including the step of,
electrically connecting the battery with the at least one load using the positive contactor device, whereby a steady-state, high-current state occurs to charge the at least one electrical load.

13. The method according to claim 12, further including the step of,
electrically disconnecting the battery from the at least one load using the low-voltage electrical device means.

14. The method according to claim 13, wherein the steps in the method in the previous claims are performed in the order recited.

15. The method according to claim 11, wherein the step of providing the low-voltage electrical device means includes the low-voltage electrical device means comprising at least one solid-state electrical device.

16. A method for electrically connecting to electrically charge at least one electrical load from a battery using a power charging assembly disposed in a power system of a hybrid electric vehicle, said power charging assembly including a positive contactor device and a negative contactor device, said method comprising:
providing a non-contactor device means;
electrically connecting the battery with the at least one electrical load using the negative contactor device;
electrically connecting the battery with the at least one electrical load using the non-contactor device means, whereby a pre-charging state occurs to charge the at least one electrical load,
wherein the step of providing the non-contacting device means includes the non-contactor device means comprising at least one solid-state electrical device, and
wherein the step of providing the at least one solid-state electrical device further includes the at least one solid-state electrical device receiving a variable pulse-width modulation (PWM) electrical signal, and the at least one electrical load being electrically charged in proportion to the received variable PWM electrical signal.

17. The method according to claim 15, wherein the step of providing the at least one solid-state electrical device includes the at least one solid-state device being one of,
(i) a FET-type device, and
(ii) an IGBT-type device.

18. A method for electrically unconnecting at least one electrical load from a battery using a power charging assembly disposed in a power system of a hybrid electric vehicle, said method comprising:
providing a positive contactor device, a negative contactor device, and a low-voltage electrical device means;
electrically connecting the battery with the at least one electrical load using the non-contactor device means;
electrically disconnecting the battery from the at least one electrical load using the positive contactor device;
electrically disconnecting the battery from the at least one electrical load using the non-contactor device means; and
electrically disconnecting the battery form the at least one electrical load using the negative contactor device.

19. The method according to claim 18, wherein the steps in the method are performed in the order recited.

20. An electric vehicle propulsion system including a power charging assembly, said power charging assembly comprising:
a negative contactor device outputting a return electrical signal to a battery and receiving a return electrical signal from the at least one electrical load;
a positive contactor device receiving an electrical signal from the battery and outputting an electrical signal to the electrical load; and
a low-voltage electrical device means adapted for receiving an electrical signal from the battery and outputting an electrical signal to the electrical load.

21. The power charging assembly according to claim 1, wherein said low-voltage electrical device means has a contact voltage rating of less than 40 volts DC and the positive and the negative contacting devices respectively have a contact voltage rating of greater than 300 volts DC.

22. A power charging assembly comprising:
a negative contactor device outputting a return electrical signal to a battery and receiving a return electrical signal from at least one electrical load;
a positive contactor device receiving an electrical signal from the battery and outputting an electrical signal to the electrical load; and
an electrical device means adapted for receiving an electrical signal from the battery and outputting an electrical signal to the electrical load,
wherein the electrical device means receives a variable pulse-width modulated (PWM) electrical signal, and the at least one electrical load electrically charges in proportion to the received PWM electrical signal.

23. A power charging assembly comprising:
a negative contactor device outputting a return electrical signal to a battery and receiving a return electrical signal from at least one electrical load;
a positive contactor device receiving an electrical signal from the battery and outputting an electrical signal to the electrical load; and
a low-voltage electrical device means adapted for receiving an electrical signal from the battery and outputting an electrical signal to the electrical load.

* * * * *